US012572738B2

(12) United States Patent
Gupta et al.

(10) Patent No.: US 12,572,738 B2

(45) Date of Patent: **\*Mar. 10, 2026**

(54) EMOJI UNDERSTANDING IN ONLINE EXPERIENCES

(71) Applicant: eBay Inc., San Jose, CA (US)

(72) Inventors: Dishan Gupta, Campbell, CA (US); Ajinkya Gorakhnath Kale, San Jose, CA (US); Stefan Boyd Schoenmackers, El Paso, TX (US); Amit Srivastava, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,431

(22) Filed: Jan. 31, 2024

(65) Prior Publication Data

US 2024/0169151 A1     May 23, 2024

Related U.S. Application Data

(63) Continuation of application No. 18/120,557, filed on Mar. 13, 2023, now Pat. No. 11,928,428, which is a (Continued)

(51) Int. Cl.
| | |
|---|---|
| *G06F 40/274* | (2020.01) |
| *G06F 40/279* | (2020.01) |
| *G06V 30/194* | (2022.01) |

(52) U.S. Cl.
CPC .......... *G06F 40/274* (2020.01); *G06F 40/279* (2020.01); *G06V 30/194* (2022.01)

(58) Field of Classification Search
USPC ............................................. 704/7–10, 257
See application file for complete search history.

(56) References Cited

U.S. PATENT DOCUMENTS

| | | | |
|---|---|---|---|
| 9,792,903 | B2 | 10/2017 | Kim et al. |
| 10,311,144 | B2 | 6/2019 | Bellegarda et al. |

(Continued)

FOREIGN PATENT DOCUMENTS

| | | |
|---|---|---|
| CN | 104050287 | 9/2014 |
| CN | 104063427 | 9/2014 |

(Continued)

OTHER PUBLICATIONS

, "Dango-Emoji & Deep Learning", Retrieved from the Internet: https://web.archive.org/web/20170719141718/https://getdango.com/emoji-and-deep-learning/, Jul. 19, 2017, 11 Pages.

(Continued)

*Primary Examiner* — Leonard Saint-Cyr
(74) *Attorney, Agent, or Firm* — FIG. 1 Patents

(57) ABSTRACT

Understanding emojis in the context of online experiences is described. In at least some embodiments, text input is received and a vector representation of the text input is computed. Based on the vector representation, one or more emojis that correspond to the vector representation of the text input are ascertained and a response is formulated that includes at least one of the one or more emojis. In other embodiments, input from a client machine is received. The input includes at least one emoji. A computed vector representation of the emoji is used to look for vector representations of words or phrases that are close to the computed vector representation of the emoji. At least one of the words or phrases is selected and at least one task is performed using the selected word(s) or phrase(s).

20 Claims, 11 Drawing Sheets

Related U.S. Application Data continuation of application No. 16/799,681, filed on Feb. 24, 2020, now Pat. No. 11,636,265, which is a continuation of application No. 15/665,133, filed on Jul. 31, 2017, now Pat. No. 10,650,095.

(56) References Cited

U.S. PATENT DOCUMENTS

| | | | |
|---|---|---|---|
| 10,387,571 | B2 | 8/2019 | Baldwin et al. |
| 10,404,636 | B2 | 9/2019 | Rodriguez et al. |
| 10,635,695 | B2 | 4/2020 | Seth et al. |
| 10,650,095 | B2 | 5/2020 | Gupta et al. |
| 11,070,879 | B2 | 7/2021 | Wu et al. |
| 11,240,179 | B2 | 2/2022 | Mishra et al. |
| 11,636,265 | B2 | 4/2023 | Gupta et al. |
| 11,928,428 | B2 | 3/2024 | Gupta et al. |
| 2009/0164914 | A1 | 6/2009 | Chen |
| 2011/0093272 | A1 | 4/2011 | Isobe et al. |
| 2011/0273455 | A1 | 11/2011 | Powar et al. |
| 2014/0088954 | A1 | 3/2014 | Shirzadi et al. |
| 2015/0100537 | A1 | 4/2015 | Grieves et al. |
| 2015/0121248 | A1 | 4/2015 | Levin et al. |
| 2015/0154251 | A1 | 6/2015 | Cockcroft et al. |
| 2015/0286371 | A1 | 10/2015 | Degani |
| 2016/0343062 | A1 | 11/2016 | Morton et al. |
| 2017/0052946 | A1 | 2/2017 | Gu et al. |
| 2017/0118189 | A1 | 4/2017 | Venkatakrishnan et al. |
| 2017/0134313 | A1 | 5/2017 | Poupart et al. |
| 2017/0185581 | A1 | 6/2017 | Bojja et al. |
| 2017/0213138 | A1 | 7/2017 | Bojja et al. |
| 2018/0021087 | A1 | 1/2018 | Anderson et al. |
| 2018/0024726 | A1* | 1/2018 | Hviding ............... G06V 40/174 715/204 |
| 2018/0061400 | A1 | 3/2018 | Carbune et al. |
| 2018/0189628 | A1* | 7/2018 | Kaufmann .............. G06F 40/56 |
| 2018/0210874 | A1 | 7/2018 | Fuxman et al. |
| 2018/0300542 | A1* | 10/2018 | Waddell ............... G06V 30/387 |
| 2019/0034412 | A1 | 1/2019 | Gupta et al. |
| 2020/0210645 | A1 | 7/2020 | Gupta et al. |
| 2023/0214590 | A1 | 7/2023 | Gupta et al. |

FOREIGN PATENT DOCUMENTS

| | | |
|---|---|---|
| CN | 105160033 | 12/2015 |
| KR | 100474014 | 3/2005 |
| KR | 1004740140000 | 3/2005 |
| KR | 20150068457 | 6/2015 |
| KR | 1020160093694 | 8/2016 |
| KR | 20160142865 | 12/2016 |
| KR | 1020160142865 | 12/2016 |
| KR | 1020150068457 | 6/2025 |
| WO | WO-2019027772 | 2/2019 |

OTHER PUBLICATIONS

"Final Office Action", U.S. Appl. No. 15/665,133, filed Mar. 4, 2019, 11 pages.
"Final Office Action", U.S. Appl. No. 15/665,133, filed Oct. 10, 2019, 12 pages.
"Final Office Action", U.S. Appl. No. 16/799,681, filed Mar. 29, 2022, 17 pages.
"International Preliminary Report on Patentability", Application No. PCT/US2018/043765, Feb. 13, 2020, 8 pages.
"International Search Report and Written Opinion", Application No. PCT/US2018/043765, Oct. 10, 2018, 12 pages.

"Non-Final Office Action", U.S. Appl. No. 15/665,133, filed Sep. 20, 2018, 11 pages.
"Non-Final Office Action", U.S. Appl. No. 15/665,133, filed May 15, 2019, 12 pages.
"Notice of Allowance", U.S. Appl. No. 15/665,133, filed Jan. 10, 2020, 8 pages.
"Response to Final Office Action", U.S. Appl. No. 15/665,133, filed Dec. 9, 2019, 14 pages.
"Response to Final Office Action", U.S. Appl. No. 16/799,681, filed Mar. 27, 2019, 28 pages.
"Response to Non-Final Office Action", U.S. Appl. No. 15/665,133, filed Aug. 9, 2019, 12 pages.
"Response to Non-Final Office Action", U.S. Appl. No. 15/665,133, filed Dec. 20, 2018, 40 pages.
"Teaching Robots to Feel: Emoji & Deep Learning", https://web.archive.org/web/20180906210258/https://getdango.com/emoji-and-deep-learning/, Jul. 19, 2017, 12 pages.
10-2020-7002616, , "Notice Of Allowance received for Korean Patent Application No. 10-2020-7002616, mailed on Sep. 28, 2021", Sep. 28, 2021, 4 Pages.
10-2020-7002616, , "Office Action received for Korean Patent Application No. 10-2020-7002616 mailed on Mar. 19, 2021", Mar. 19, 2021, 7 Pages.
10-2020-7002616, , "Voluntary Amendment filed for Korean Patent Application No. 10-2020-7002616 on Jan. 28, 2020", Jan. 28, 2020, 34 Pages.
10-2021-7042971, , "Notice of Allowance", KR Application No. 10-2021-7042971, Sep. 28, 2022, 8 pages.
10-2021-7042971, , "Office Action received for Chinese Patent Application No. 10-2021-7042971 mailed on Feb. 28, 2022", Feb. 28, 2022, 6 Pages.
U.S. Appl. No. 16/799,681, , "Non Final Office Action Received for U.S. Appl. No. 16/799,681, mailed on Oct. 27, 2021", Oct. 27, 2021, 14 pages.
U.S. Appl. No. 16/799,681, , "Non-Final Office Action", U.S. Appl. No. 16/799,681, filed Jun. 22, 2022, 20 pages.
U.S. Appl. No. 16/799,681, , "Notice of Allowance", U.S. Appl. No. 16/799,681, filed Dec. 14, 2022, 9 pages.
U.S. Appl. No. 18/120,557, , "Non-Final Office Action", U.S. Appl. No. 18/120,557, 14 pages.
U.S. Appl. No. 18/120,557, , "Notice of Allowance", U.S. Appl. No. 18/120,557, filed Jan. 9, 2024, 8 pages.
U.S. Appl. No. 18/120,557, , "Notice of Allowance", U.S. Appl. No. 18/120,557, filed Oct. 31, 2023, 8 pages.
201880038506.8, , "Foreign Office Action", CN Application No. 201880038506.8, Apr. 1, 2023, 6 pages.
201880038506.8, , "Notice of Allowance", CN Application No. 201880038506.8, Aug. 30, 2023, 4 pages.
Ai, Wei et al., "Untangling Emoji Popularity through Semantic Embeddings", Proceedings of the Eleventh International AAAI Conference on Web and Social Media (ICWSM 2017), 10 pages.
Cappallo, Spencer et al., "Image2Emoji: Zero-shot Emoji Prediction for Visual Media", Oct. 13, 2015, 4 pages.
Dong, Jianfeng et al., "Word2VisualVec: Cross-Media Retrieval by Visual Feature Prediction", retrieved from https://www.researchgate.net/publication/301648180, Apr. 2016, 11 pages.
Eisner, Ben et al., "emoji2vec: Learning Emoji Representations from their Description", Nov. 20, 2016, 7 pages.
Pennington, Jeffrey et al., "GloVe: Global Vectors for Word Representation", Proceedings of the 2014 Conference on Empirical Methods in Natural Language Processing (EMNLP) [retrieved on Sep. 7, 2022], Retrieved from the Internet: <https://www.aclweb.org/anthology/D14-1162.pdf>., Sep. 2014, 12 pages.
Wijeratne, Sanjaya et al., "A Semantics-Based Measure of Emoji Similarity", Jul. 14, 2017, 18 pages.

* cited by examiner

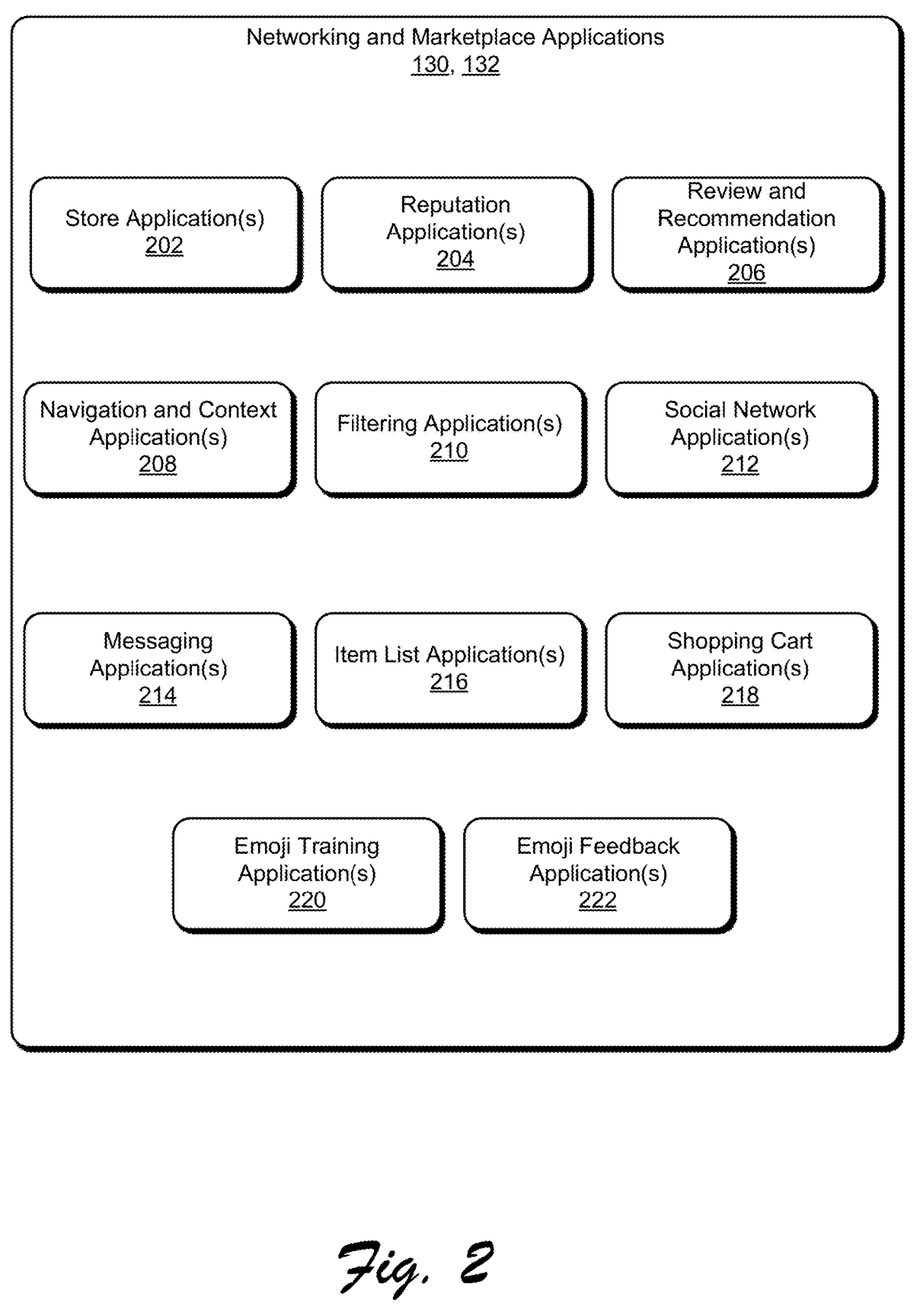

Networking and Marketplace Applications
130, 132

Store Application(s)
202

Reputation
Application(s)
204

Review and
Recommendation
Application(s)
206

Navigation and Context
Application(s)
208

Filtering Application(s)
210

Social Network
Application(s)
212

Messaging
Application(s)
214

Item List Application(s)
216

Shopping Cart
Application(s)
218

Emoji Training
Application(s)
220

Emoji Feedback
Application(s)
222

Fig. 2

$$v_j = \sum_{k=1}^{N} w_k$$

grinning face person juggling $$\mathcal{L}(i, j, y_{ij}) = -\log(\sigma(y_{ij} x_i^T v_j - (1 - y_{ij}) x_i^T v_j))$$

Where $y_{ij}$ -- 1 True Description, 0 False Description $v_j$ -- Description vector representation $x_i^T$ -- Emoji vector representation

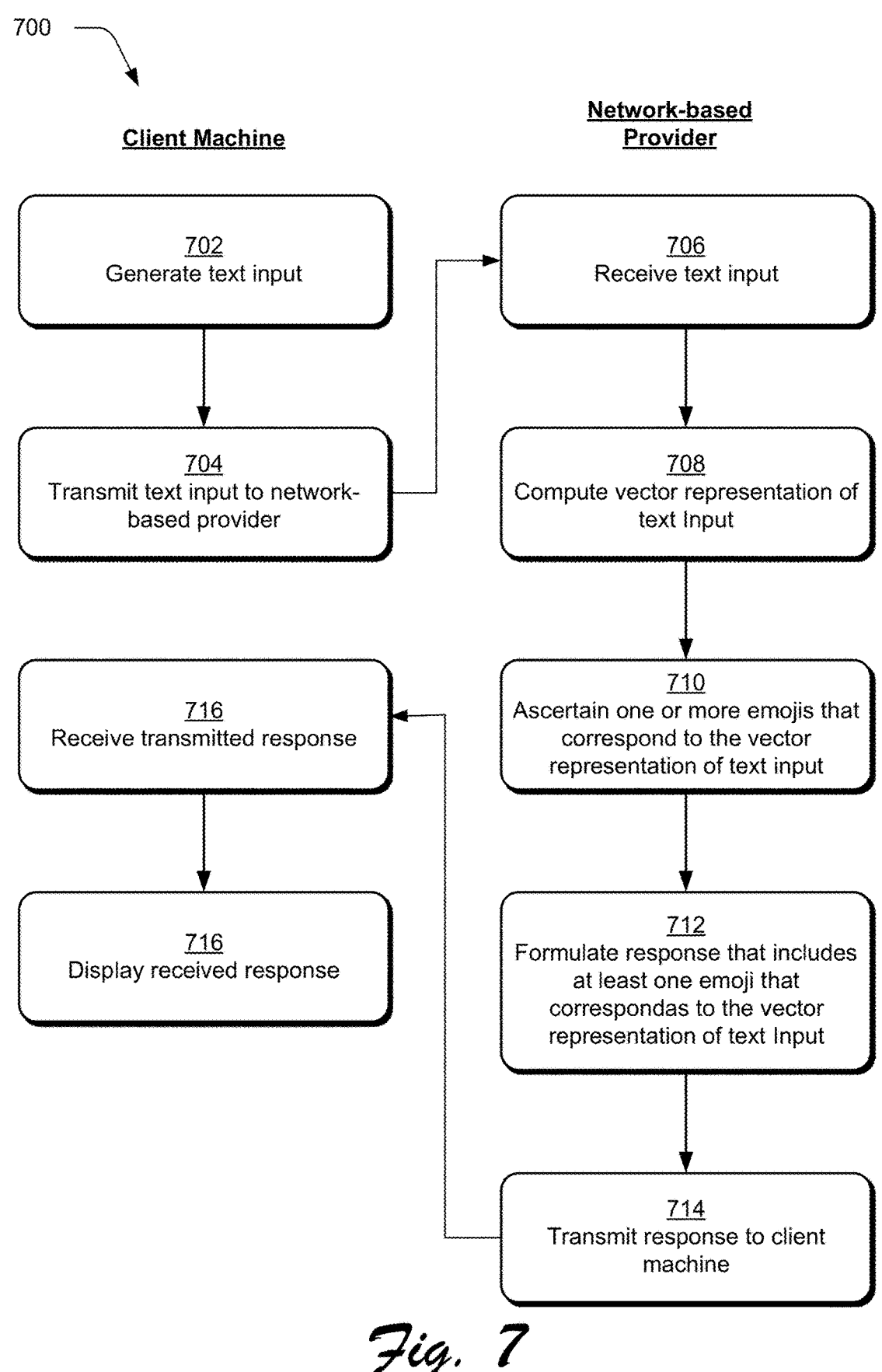

Client Machine

Network-based Provider

702
Generate text input

706
Receive text input

704
Transmit text input to network-based provider

708
Compute vector representation of text Input

716
Receive transmitted response

710
Ascertain one or more emojis that correspond to the vector representation of text input 716
Display received response 712
Formulate response that includes at least one emoji that correspondas to the vector representation of text Input 714
Transmit response to client machine

Client Machine

902
Generate input that includes an emoji

904
Transmit input to network-based provider

Network-based Provider

906
Receive input

908
Compute or obtain vector representation of emoji

910
Based on vector representation of emoji, perform one or more tasks

1100

EMOJI UNDERSTANDING IN ONLINE EXPERIENCES

CLAIMS OF PRIORITY

This application is a continuation of and claims priority to U.S. patent application Ser. No. 18/120,557, filed Mar. 13, 2023, which is a continuation of and claims priority to U.S. patent application Ser. No. 16/799,681, filed Feb. 24, 2020, which is now U.S. Pat. No. 11,636,265, issued Apr. 25, 2023, which is a continuation of and claims priority to U.S. patent Ser. No. 15/665,133, filed Jul. 31, 2017, which is now U.S. Pat. No. 10,650,095, issued May 12, 2020, which are hereby incorporated by reference in their entireties.

TECHNICAL FIELD

This application relates to a method and system for use with online experiences, according to one embodiment, and more specifically, for understanding small digital images or icons associated with online experiences.

BACKGROUND

These days, many forms of communication can utilize emojis. Emojis are small digital images or icons that are used to express an idea or emotion. Examples of emojis include a "smiley face" image or a "thumbs up" image. The communications that can utilize emojis include, by way of example and not limitation, email communications, chat communications, communications through various applications such as a web browser, social media application, interactive shopping experiences, and the like. The use of emojis continues to grow in popularity every year.

While emojis continue to grow in popularity, the way in which these emojis are represented make them difficult to employ in scenarios that are designed to enhance a user's experience. For example, emojis are represented using special unicode encoding, e.g., "u'\U0001f4c". The unicode representations make the use of emojis particularly challenging with applications that employ natural language processing. This is because the unicode representation does not convey context, but only maps to a particular emoji. In addition, the context in which an emoji is used may lead to an ambiguous interpretation. For example, if a user uses a "smiley face", the user may be conveying happiness or sarcasm depending on the context in which the emoji is used. Accordingly, approaches that use a flat dictionary lookup to map an emoji to a meaning may likely return an inaccurate definition. For example, a "smiley face" may be mapped to a short name such as "beaming face with smiling eyes" such that it is constrained to this definition. Yet, if the user intended sarcasm in a message in which the emoji was used, this short name will lead to a misinterpretation.

So, against this backdrop there is a twofold problem in the use of emojis. The first problem pertains to understanding the emoji in the context in which it is used, as in the example above. The second problem pertains to being able to respond in a contextual situation, with an emoji and/or a message in a manner that is accurate and consonant with the contextual situation.

BRIEF DESCRIPTION OF THE DRAWINGS

The various embodiments is illustrated by way of example, and not by way of limitation, in the figures of the accompanying drawings in which:

FIG. 2 illustrates example networking and marketplace applications in accordance with one or more embodiments;

FIG. 5 illustrates aspects of a training method in accordance with one or more embodiments;

FIG. 7 is a flow diagram that describes operations in accordance with one or more embodiments;

DETAILED DESCRIPTION

Overview

Figure 1:
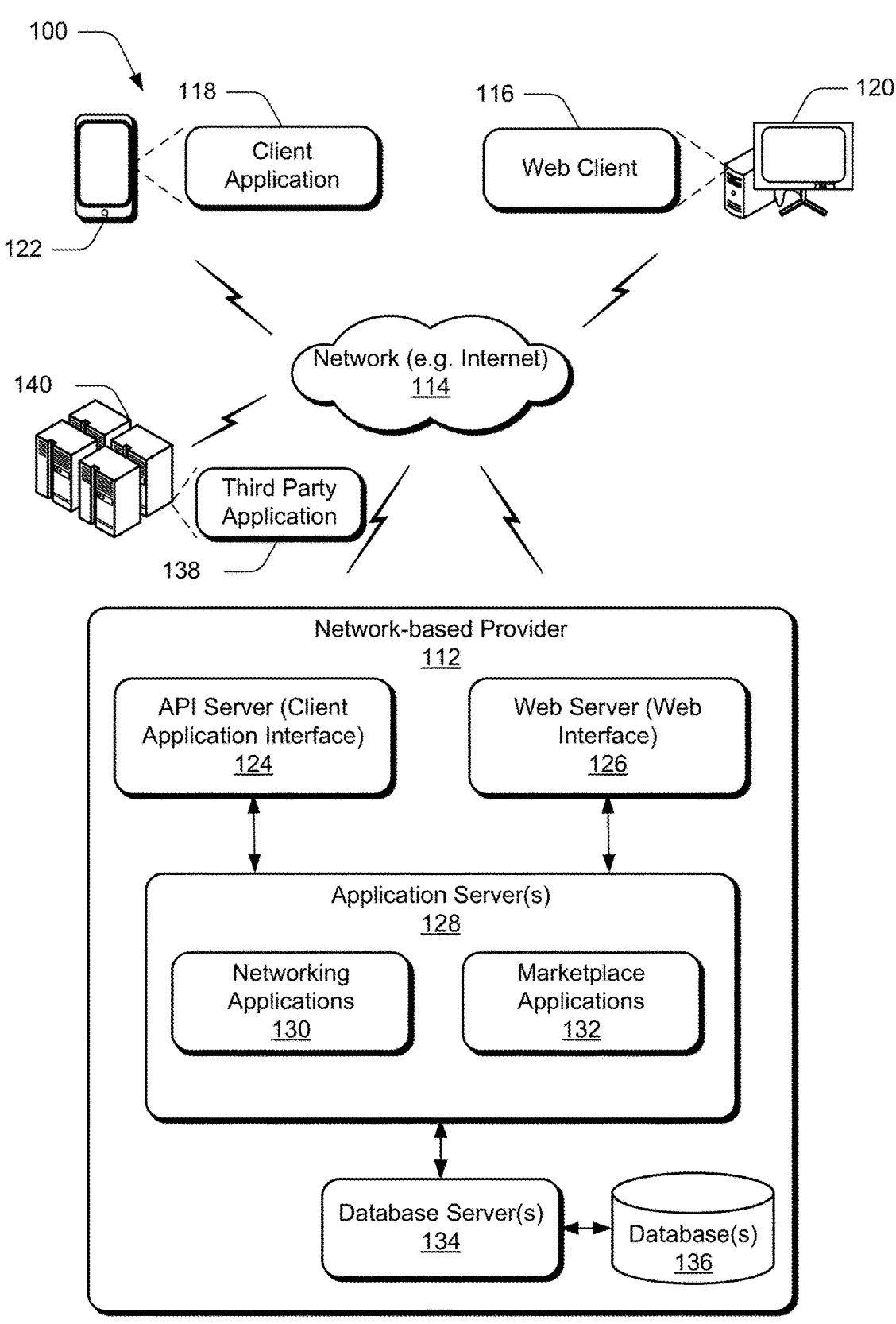
FIG. 1 is a network diagram depicting a network system, according to one embodiment, having a client-server architecture configured for exchanging data over a network.

In the following description, for purposes of explanation, numerous specific details are set forth in order to provide a thorough understanding of the various embodiments. It will be evident, however, to one of ordinary skill in the art that the various embodiments may be practiced without these specific details.

In one embodiment, a system and method is utilized to train emojis based on the text embeddings of their descriptions. That is, individual emojis have a corresponding description. This description may or may not change over time. The emoji embeddings are also trained based on various contextual information such as, for example, a user's chat history in which the emoji was used in connection with communication content, such as text that may have been provided by the user. This can be done, in at least some embodiments, through the use of a deep learning model which enables emojis to be represented in a low-dimensional vector space that can also be used to represent natural language text. With emojis being trained in the same context as natural language text, the low-dimensional vectors associated with the emojis can be projected to be close to the context in which they appear, thus aiding in the understanding of text that is similar to the emojis.

Using a training model to process emojis as described above and below carries with it a number of advantages that improve upon the current state of the technology. For example, a deeper more accurate understanding of a user's use of a particular emoji can be attained. This is due, at least in part, to mitigating inaccurate results stemming from approaches that employ a flat dictionary lookup to ascertain the meaning of a particular emoji. Furthermore, various automated applications can employ the techniques described herein to provide a much more robust, accurate, and efficient user experience when a user interacts with a particular application. For example, in the interactive shopping context in which a user purchases items online, a user may provide an emoji along with some relevant text to conduct a search.

By understanding these user-provided emojis and their particular contextual relevance, responses can be formulated to the user which return emojis that are contextually relevant to a user's search. Examples of how this can be done are provided below.

In at least some embodiments, text input is received and a vector representation of the text input is computed. Based on the vector representation, one or more emojis that correspond to the vector representation of the text input are ascertained and a response is formulated that includes at least one of the one or more emojis.

In other embodiments, input from a client machine is received. The input includes at least one emoji. A computed vector representation of the emoji is used to look for vector representations of words or phrases that are close to the computed vector representation of the emoji. At least one of the words or phrases is selected and at least one task is performed using the selected word(s) or phrase(s).

The techniques described herein have wide applicability in online scenarios including, by way of example and not limitation, interactive shopping experiences. In various example embodiments, an interactive shopping network aims to simplify, facilitate, and improve the efficiency of an interactive shopping experience using emojis. This interactive or virtual shopping technique can improve an online shopping experience for a user using an e-commerce platform, such as eBay.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system. The data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

A data exchange platform, in an example form of a network-based provider 112 (or host system/site), provides server-side functionality, via a network 114 (e.g., the Internet) to one or more clients. The clients may include users that may utilize the network system 100 and more specifically, the network-based provider 112, to exchange data over the network 114. These transactions may include transmitting, receiving (communicating) and processing data to and from the multitude of users. The data may include, but is not limited to, user data including, user image data, user gesture data, user preference information, user profile information, ad search queries, search keywords, shopping or listing context information and/or identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, etc. In one embodiment, the user information can be associated with one or more contexts generated by a user or other users and maintained on the network-based provider 112. Data associated with a user, such as any of the data described above, may be publicly shared as determined by the originator of the data.

Network system 100 also includes various client machines such as client machine 120 that may utilize a web client 116 to interact with network-based provider 112, and a client machine 122 that may utilize a client application 118 to interact with network-based provider.

In one or more embodiments, the network-based provider includes an application program interface (API) server 124 and a web server 126 coupled to, and providing programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a user or item listing via a toolbar installed on a browser application. The toolbar may allow for a user or a third party to create a new user profile (a profile creator), selectively add a uniform resource locator (URL) associated with the created user profile, and create notations regarding research and general matters associated with the user profile. In other embodiments, the web server 126 may serve a page or the API server 124 in conjunction with the client application 118 may provide the same or similar functionality as that described with reference to the toolbar.

The marketplace application(s) 132 may provide a number of marketplace functions and services (e.g., item listings, searching, advertisement, payment, emoji training and use in supporting interactive shopping, etc.) to users that access the network-based provider 112. The networking application(s) 130 likewise may provide a number of consumer services, merchant services, or social networking services and functions to users. The networking application(s) 130 may allow a user to generate one or more contexts related to shopping or advertisement (ad) generation, which may include listings (e.g., for products and services) couched as a broad category associated with a consumer, a class of consumers, and/or an item (e.g., a product or service or a listing for a product or service) or class of items. Additionally, listings can be couched as associated with a specific consumer or a specific item. For example, listings in the form of a category could be, "jackets" or "shoes." Similarly, a context can include a user profile associated with a category of users or a specific user. For example, a user profile in the form of a category could be, "women over 40 years old" or "purchasers of sports apparel." An example of a user profile in a more specific form may be, "a user profile for John A. Smith of Akron, Ohio" or "purchasers of Nike running shoes." The level of specificity may vary and is selectable by the user profile creator or administrator of the interactive shopping engine of a particular embodiment. For example, the user profile can be as specific as a particular person or the associated listing associated with a make, model, additional specific attributes or features of a specific item or service offered for sale or lease.

In one embodiment, the networking application(s) 130 and marketplace application(s) 132 may provide a client (e.g., web client 116) with an interface that includes input fields, including emojis, for personality or item/listing attributes most commonly selected by other users as the most important or most determinative attributes related to the products/services which a user/consumer is seeking or selling. For example, a multitude of users may have indicated they thought the most important personality attributes for the user profile include information related to: 1) consumer/user need, 2) general consumer/user personality, 3) consumer/user shopping attitude, and 4) consumer/user budget. A multitude of other users may have indicated they thought the most important item attributes for a sports apparel purchaser user profile include: 1) sports apparel brand, 2) cost, and 3) size. These user profile attributes may be independently developed or discovered by the network-based provider 112 by processing the attribute data received from the multitude of users or may be based on the user profile creator ranking the attributes or a combination thereof.

The networking application(s) 130 may allow the user profile creator or interactive shopping engine user to distribute the one or more user profiles to one or more groups defined by the user profile creator or interactive shopping engine user (e.g., "my family," "my friends," etc.) or to groups at various levels in a predefined category (e.g., "running group," "sports apparel group," or "Nike running shoe group," etc.).

While the networking application(s) 130 and the marketplace application(s) 132 are shown in FIG. 1 to form part of the network-based provider 112, it will be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based provider 112 via the programmatic interface provided by the API server 124. For example, the third party application 138 may, utilizing information retrieved from the network-based provider 112, support one or more features or functions on a website hosted by the third party. The third party website may, for example, provide one or more networking, marketplace or payment functions that are supported by the relevant applications of the network-based provider 112.

Having considered an example environment in accordance with one or more embodiments, consider now an example networking and marketplace application in accordance with one or more embodiments.

Example Networking and Marketplace Application(s)

FIG. 2 is a block diagram illustrating an example embodiment of multiple network and marketplace application(s) 130 and 132, respectively, which are provided as part of the network-based provider 112. The network-based provider 112 may provide a number of feeds or listings for goods and/or services, category-based shopping, social networking, and purchase and bidding systems, various levels of features provided for users, and price-setting mechanisms whereby a seller may list goods and/or services (e.g., for sale, bid, or lease) and a buyer may buy or bid on listed goods and/or services. A user profile and context associated with a user shopping or listing an item in the network-based provider 112 may offer or provide information that may be helpful in assisting the interactive shopping engine user in customizing their shopping or listing experience pertaining to the user profile or listing information (i.e., context).

Among various embodiments, the recommendations, reviews, or research notes corresponding to the user profile or listing information may be directed from another user to one or more users desiring data associated with the user profile or listing information or the data may be provided from storage by the network and marketplace application(s) 130 and 132 based on the user profile or listing information provided by a user. The data may be provided based on a request from the user profile creator or automatically pushed to the user profile creator based on policy or a user configuration file.

To this end, the network and marketplace application(s) 130 and 132, respectively, are shown to include one or more application(s) which support the network-based provider 112, and more specifically the generation and maintenance of one or more user profiles provided by users of the network-based provider 112 or interactive shopping engine users. These applications can include support for activities associated with the user profiles and listing information, including storing and retrieving user notes, web sites (URLs), links associated with related tags, research and notes from other users and community members, related community groups, vendors, providing localized geographic data for user profiles (e.g., regional or country-specific consumer purchasing patterns), etc. Additionally, the various applications may support social networking functions, including building and maintaining the community groups created by a user, which may be helpful in providing various types of data (e.g., reviews, notes, local services, consumer information, etc.) pertaining to the user profiles and listing information. Moreover, the applications can support emoji training and feedback as described in more detail below.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller and consumer. In one embodiment, based on the user profiles provided by the user profile creator, the virtual store may be provided to the user profile creator or interactive shopping engine user where the virtual store may carry or sell an item or service related to a user's need based on the user profile.

Reputation application(s) 204 may allow parties that transact utilizing the network-based provider 112 to establish, build, and maintain reputations, which may be made available and published to potential trading partners. Consider that where, for example, the network-based provider 112 supports person-to-person trading, users may have no history or other reference information whereby the trustworthiness and/or credibility of potential trading partners may be assessed. The reputation application(s) 204 may allow a user, for example through feedback provided by other transaction partners, to establish a reputation within the network-based provider 112 over time. Other potential trading partners may then reference such a reputation for the purposes of assessing credibility, trustworthiness, or the like. A user creating a user profile and seeking reviews, research (e.g., notes, etc.), and recommendations associated with the profile may filter the result data from the search or context submission based on reputation data. For example, the user profile creator may only want profile data such as reviews and research notes pertaining to the user profile from other users with a greater than 3 out of 5 star reputation rating.

In one embodiment, the network-based provider 112 includes review and recommendation application(s) 206. The social networking application(s) 212 may work in conjunction with the review and recommendation application(s) 206 to provide a user interface to facilitate the entry of reviews of the user profile data received from other users. A review may be a text entry of the community group member's opinion, a standard review form including check boxes indicating a level satisfaction, or a combination of both, etc. Recommendations may include a specific type of demographic, item, a specific brand or service for a type of item, a specific retailer for the item, etc.

Navigation of the network-based provider 112 may be facilitated by one or more navigation and context application(s) 208. For example, a context application may, inter alia, enable key word searches of item listings associated with a context defined by a user profile of a particular consumer. The context can include an association between the user profile data in the user profile and item feature sets related to items in the item listings. The item listings can include listings from a group including products or services or both. The item feature set data and data defining the association between the user profile data in the user profile and item feature sets may be retrieved from the network-based provider 112 (e.g., databases 136) or from various other remote sources, such as other network sites, other users (e.g., experts or peers), etc. In one embodiment, a toolbar installed on a browser application may be used for functions including interactive and navigation functions to create a new user profile, selectively add a uniform resource locator (URL) associated with the created user profile, and create notations regarding research and general matters associated with the user profile. These functions may be user accessible by many methods, including a web form interface (HTML or embedded Java) or a stand-alone application interface. For example, a navigation application may include a browser that allows users via an associated user interface to browse a user's user profile, various item listings, item feature sets, contexts, catalogues, inventories, social networks, and review data structures within the network-based provider 112. In one embodiment, the user interface includes selectable elements in the form of tabs to separate out various categories of user profile data that when selected generate a list associated with the category. For example, a tab for "My Notes," a tab for "Everyone's Notes," a tab for "Buy," and a tab for "Sell". Various other navigation applications (e.g., an external search engine) may be provided to supplement the search and browsing applications.

In one embodiment, using filtering application(s) 210, the user or interactive shopping engine user may customize result data associated with a user profile or listing search results. The filtering application(s) 210 may generate the result data according to one or more rules provided by the network-based provider 112 and the user receiving the filtered result data. For example, as discussed above with reference to the reputation application(s) 204, the user may only want the user profile to match on item listings pertaining to item reviews from other users with a greater than 3 out of 5 star reputation rating. In another example, the user may only want user profile data to match on item listings pertaining to item listings with a particular feature set or attribute set. For example, the user may only want result data for Nike shoes with a size equal or greater than size 10-wide. Additionally, the filtering rules may be combinable or modifiable to broaden or narrow the scope of the result data. The filtering application(s) 210 may also be used to implement rules for granting or allowing access to the user profile data.

Messaging application(s) 214 may be used for the generation and delivery of messages to users of the network-based marketplace 112. For example, the user may like a particular review or research from another user and may wish to contact the user for additional information. In one embodiment, the messaging application(s) 214 may be used in conjunction with the social networking application(s) 212 to provide promotional and/or marketing (e.g., targeted advertisements associated with the user profile) to the user or a related user from vendors and community members that may have offerings related to the user profile.

Item list application(s) 216 may be used in the network-based provider 112 by the user to create an item list based on selecting one or more items and services to purchase (or sell, auction, lease, or donate), which may be at least partially based on result data associated with the user's shopping experience. The item list application(s) 216 may be accessed via a user interface that allows the user to create and use the item list. Additionally, the user may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a user to add and store items from a shopping list generated by the user (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, etc. In one embodiment, a multitude of transactions may appear as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

The emoji training application(s) 220 is responsible for training emojis based on the text embeddings of their descriptions. That is, individual emojis have a corresponding description. This description may or may not change over time. The emoji embeddings are also trained based on various contextual information such as, for example, a user's chat history in which the emoji was used in connection with communication content, such as text that may have been provided by the user. For example, the user in the course of interacting with the network-based provider 112, may have employed messaging application 214 to send and receive messages to and from other users. The user may also have used the messaging application 214 to provide feedback to the proprietor of the network-based provider. In the course of employing messaging application 214, the user may have used a number of different emojis in formulating their communications. In these and other instances, the emoji training application can maintain user logs which can be processed, as described above and below, to train the emojis based not only on the text embeddings of their descriptions, but the various contextual information surrounding the emoji's use and a user's message. This can be done, in at least some embodiments, through the use of a deep learning model which enables emojis to be represented in a low-dimensional vector space that can also be used to represent natural language text. With emojis being trained in the same context as natural language text, the low-dimensional vectors associated with the emojis can be projected to be close to the context in which they appear, thus aiding in the understanding of text that is similar to the emojis.

The emoji feedback application(s) 222 build upon the emoji training application which provides a deeper more accurate understanding of a user's use of a particular emoji. This is due, at least in part, to mitigating inaccurate results stemming from approaches that employ a flat dictionary lookup to ascertain the meaning of a particular emoji. Furthermore, various automated applications, including those employed by network-based provider 112, as well as other providers which may not necessarily be in the interactive shopping experience space, can employ the techniques described herein to provide a much more robust, accurate, and efficient user experience when a user interacts with a particular application. For example, in the interactive shopping context in which a user purchases items online, a user may provide an emoji along with some relevant text to conduct a search. By understanding these user-provided emojis and their particular contextual relevance, responses can be formulated by the emoji feedback application 222 to the user which return emojis that are contextually relevant to a user's search. Examples of how this can be done are provided below.

It will be appreciated that one or more of the various sample networking and marketplace application(s) 130, 132 may be combined into a single application including one or more modules. Further, in some embodiments, one or more applications may be omitted and additional applications may also be included.

Having considered an example networking and marketplace application in accordance with one or more embodiments, consider now emoji training in accordance with one or more embodiments.

Emoji Training

Figure 3:
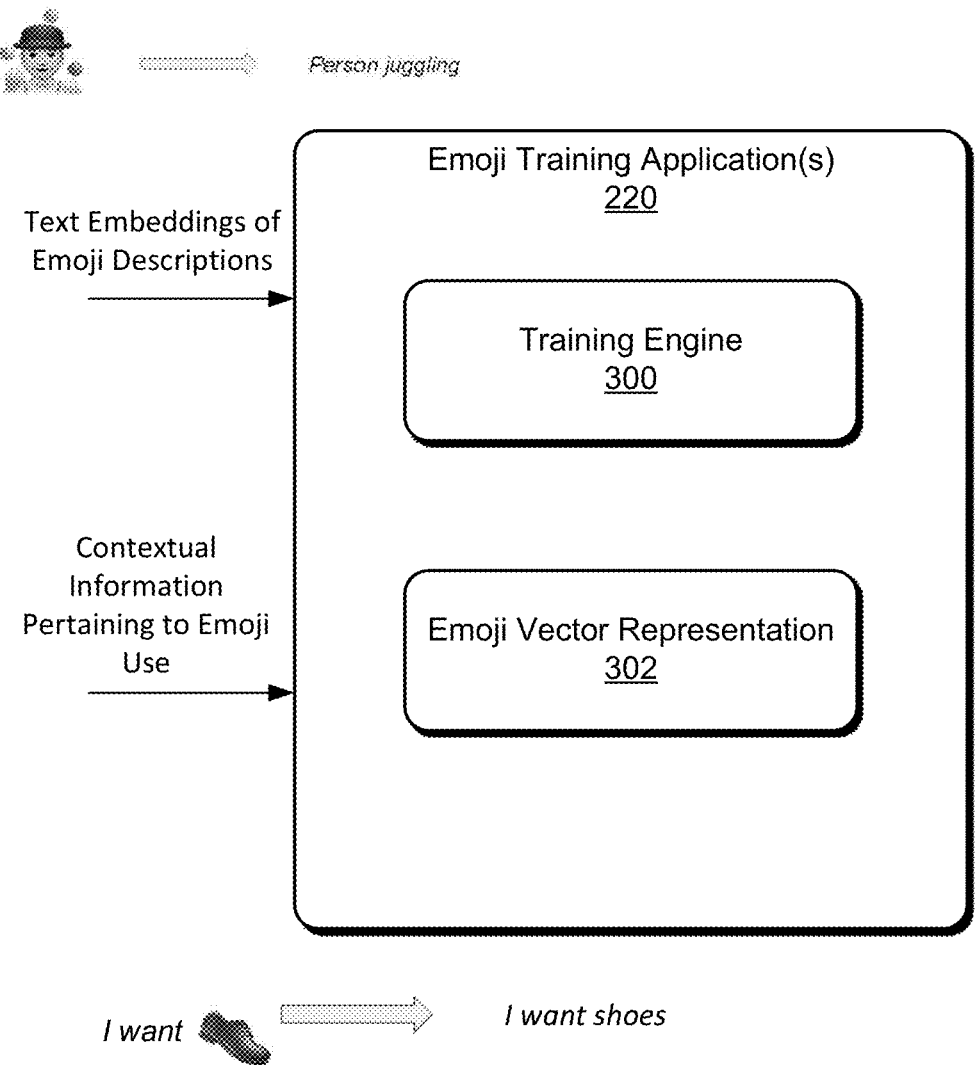
FIG. 3 illustrates an example emoji training application in accordance with one or more embodiments.

The emoji training application(s) 220 is responsible for training emojis based on the text embeddings of their descriptions. That is, individual emojis have a corresponding description. This description may or may not change over time. The emoji embeddings are also trained based on various contextual information such as, for example, a user's chat history in which the emoji was used in connection with communication content, such as text that may have been provided by the user. As an example, consider FIG. 3. It is to be appreciated and understood that any suitable type of training can take place. As such, the example provided below is not intended to limit application of the claimed subject matter.

There, emoji training application(s) 220 includes a training engine 300 and an emoji vector representation 302.

In one or more embodiments, the training engine 300 uses a deep learning model which enables emojis to be represented in a low-dimensional vector space, here represented by emoji vector representation 302, that can also be used to represent natural language text. With emojis being trained in the same context as natural language text, the low-dimensional vectors associated with the emojis can be projected to be close to the context in which they appear, thus aiding in the understanding of text that is similar to the emojis.

In the illustrated and described embodiment, the emojis are trained using the corresponding texts embeddings of the emoji descriptions, as well as contextual information pertaining to emoji use. For example, in the illustration, a person is illustrated juggling three balls along with the short description "person juggling." This is used by the training engine 300 to train the emoji. The contextual information can include any suitable type of contextual information including, by way of example and not limitation, text information from various users, chat logs that are maintained by network-based provider 112, third-party repositories of information including communications that utilize emojis, and the like. For example, in the illustrated embodiment, a statement "I want" is followed with an emoji in the form of a shoe. This input is used, including the contextual text information, to train the emoji.

In addition, as text embeddings of emoji descriptions, as well as contextual information pertaining to emoji use can change over time, the emoji training application 220 can periodically re-train itself to provide emoji vector representations 302 that dynamically re-adjust due to changes in the meaning and context of various emojis. This, in turn, constitutes an improvement over past approaches which used a flat, static dictionary-type lookup which lacked in dynamic flexibility.

In the illustrated and described embodiment, the training engine 300 can employ any suitable type of training model to produce the vector representations. One such training model is referred to as Glo Ve: Global Vectors for Word Representation, developed by Jeffrey Pennington, Richard Socher, and Christopher D. Manning of Stanford, and available at the following link: https://nlp.stanford.edu/projects/glove/.

Essentially, as will be appreciated by the skilled artisan, GloVe is an unsupervised learning algorithm for obtaining vector representations for words. Unsupervised learning is employed by the training engine 300 to essentially represent individual emojis by a vector representation. The vector representation can be thought of as an embedding for words. The intuition behind embeddings is that words that appear close in the embedding have a similar meaning. For example, "red" and "green" would have vector representations that are close in the embedding space, thus implying a similar meaning. On the other hand, "red" and "orangutan" might not be as close as represented by their vector representation. Accordingly, such would imply that the words do not have a similar meaning. Thus, one goal of the current approach is to represent emojis in the same embedding space as actual words through the use of emoji vector representations. In this manner, an emoji that is represented by a vector representation can be processed as if it were simply a word or phrase.

Training is performed on aggregated global word-word co-occurrence statistics from a corpus (for example, a chat log or several chat logs), and the resulting representations showcase interesting linear substructures of the word vector space. Some highlights of the Glo Ve approach are as follows.

The Euclidean distance (or cosine similarity) between two word vectors provides an effective method for measuring the linguistic or semantic similarity of the corresponding words. Sometimes, the nearest neighbors according to this metric reveal rare but relevant words that lie outside an average human's vocabulary. For example, here are the closest words to the target word frog: frogs, toad, litoria, leptodactylidae, rana, lizard, and eleuther is odactylus.

The similarity metrics used for nearest neighbor evaluations produce a single scalar that quantifies the relatedness of two words. This simplicity can be problematic since two given words almost always exhibit more intricate relationships than can be captured by a single number. For example, man may be regarded as similar to woman in that both words describe human beings; on the other hand, the two words are often considered opposites since they highlight a primary axis along which humans differ from one another.

In order to capture in a quantitative way the nuance necessary to distinguish man from woman, it is necessary for a model to associate more than a single number to the word pair. A natural and simple candidate for an enlarged set of discriminative numbers is the vector difference between the two word vectors. GloVe is designed in order that such vector differences capture as much as possible the meaning specified by the juxtaposition of two words.

The underlying concept that distinguishes man from woman, i.e. sex or gender, may be equivalently specified by various other word pairs, such as king and queen or brother and sister. To state this observation mathematically, we might expect that the vector differences man-woman, king-queen, and brother-sister might all be roughly equal. This property and other interesting patterns can be observed in the above set of visualizations.

The GloVe model is trained on the non-zero entries of a global word-word co-occurrence matrix, which tabulates how frequently words co-occur with one another in a given corpus. Populating this matrix requires a single pass through the entire corpus to collect the statistics. For large corpora, this pass can be computationally expensive, but it is a one-time up-front cost. Subsequent training iterations are much faster because the number of non-zero matrix entries is typically much smaller than the total number of words in the corpus.

The tools provided in this package automate the collection and preparation of co-occurrence statistics for input into the model. The core training code is separated from these preprocessing steps and can be executed independently.

GloVe is essentially a log-bilinear model with a weighted least-squares objective. The main intuition underlying the model is the simple observation that ratios of word-word co-occurrence probabilities have the potential for encoding some form of meaning. For example, consider the co-occurrence probabilities for target words ice and steam with various probe words from the vocabulary. Here are some actual probabilities from a 6 billion word corpus:

| Probability and Ratio | k = solid | k = gas | k = water | k = fashion |
|---|---|---|---|---|
| P(k\|ice) | $1.9 \times 10^{-4}$ | $6.6 \times 10^{-5}$ | $3.0 \times 10^{-3}$ | $1.7 \times 10^{-5}$ |
| P(k\|steam) | $2.2 \times 10^{-5}$ | $7.8 \times 10^{-4}$ | $2.2 \times 10^{-3}$ | $1.8 \times 10^{-5}$ |
| P(k\|ice)/P(k\|steam) | 8.9 | $8.5 \times 10^{-2}$ | 1.36 | 0.96 |

As one might expect, ice co-occurs more frequently with solid than it does with gas, whereas steam co-occurs more frequently with gas than it does with solid. Both words co-occur with their shared property water frequently, and both co-occur with the unrelated word fashion infrequently. Only in the ratio of probabilities does noise from non-discriminative words like water and fashion cancel out, so that large values (much greater than 1) correlate well with properties specific to ice, and small values (much less than 1) correlate well with properties specific of steam. In this way, the ratio of probabilities encodes some crude form of meaning associated with the abstract concept of thermodynamic phase.

The training objective of GloVe is to learn word vectors such that their dot product equals the logarithm of the words' probability of co-occurrence. Owing to the fact that the logarithm of a ratio equals the difference of logarithms, this objective associates (the logarithm of) ratios of co-occurrence probabilities with vector differences in the word vector space. Because these ratios can encode some form of meaning, this information gets encoded as vector differences as well. For this reason, the resulting word vectors perform very well on word analogy tasks.

Figure 4:
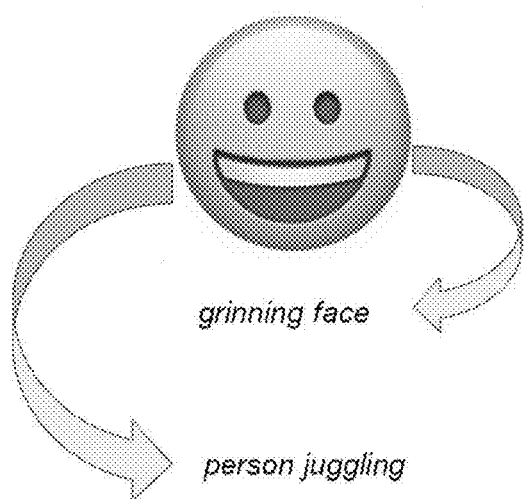
FIG. 4 illustrates aspects of a training method in accordance with one or more embodiments.

FIG. 4 illustrates, using the principles described above, the way that embeddings are computed for each of the emojis that is of interest. So, considering the large number of emojis that exist and continue to be created, the goal is to represent the emojis in the same vector space as words. As noted above, this enables emojis to simply be treated as words or phrases in the processing that takes place.

In the illustrated equation, $v_j$ represents the description vector representation, i.e., "grinning face", "person juggling", and the like. For any particular emojis, the intuition behind this formula is that $v_j$ is to be optimized based upon the description. Essentially then the description of the particular emoji is likely a reasonable proxy for what the emoji means. Accordingly, the description of the emoji can be processed to compute an average over all of the words in that description to ascertain the associated vectors for that emoji that place it closest in space to the description, and far from some randomly chosen description. Accordingly, the vectors associated with the illustrated emoji would place it close to "grinning face" in the vector space, and far from "person juggling."

Next, the training objective of training engine 300 is to use sigmoid-cross-entropy loss for the dot product between an emoji and its description vector representations. As an example, consider FIG. 5.

There, and expression for the sigmoid-cross-entropy loss for the dot product is illustrated where $y_{ij}$ represents a true description as a value of "1" and a false description is a value of "0", $v_j$ represents the description vector representation, and $x_i^T$ represents the emoji vector representation. The latter term is a representation of words in the description of the emoji. The goal of the represented equation is to select a $v_j$ that is closest to the description of the emoji and far away from a random description. Once this information is ascertained, the emojis can be treated as additional words or phrases for the purpose of the processing described below.

So, for example, this information permits the system to ascertain that a "pants" emoji is close to "pants", "jeans", "leggings", and the like, in the vector representation space. That is, the vector associated with the "pants" emoji will be close to vectors associated with the words "pants", "jeans", "leggings", and the like. This can permit an enriched user experience as described in more detail in the section just below.

Again, it is to be appreciated and understood, that the training model that is employed can be any suitable training model. Accordingly, the above-described model is for illustrative purposes only, and is not to be used to limit application of the claimed subject matter.

Emoji Feedback

Having developed the information above, what has emerged is that emojis are represented by vectors in the same dimensional space as actual words and phrases. This permits a rich semantic understanding of what the emoji actually means. Given this, powerful use scenarios can be provided including, by way of example and not limitation, (1) text-to-emoji scenario and (2) emoji-to-text scenarios.

Text-to-Emoji Scenarios

Figure 6:
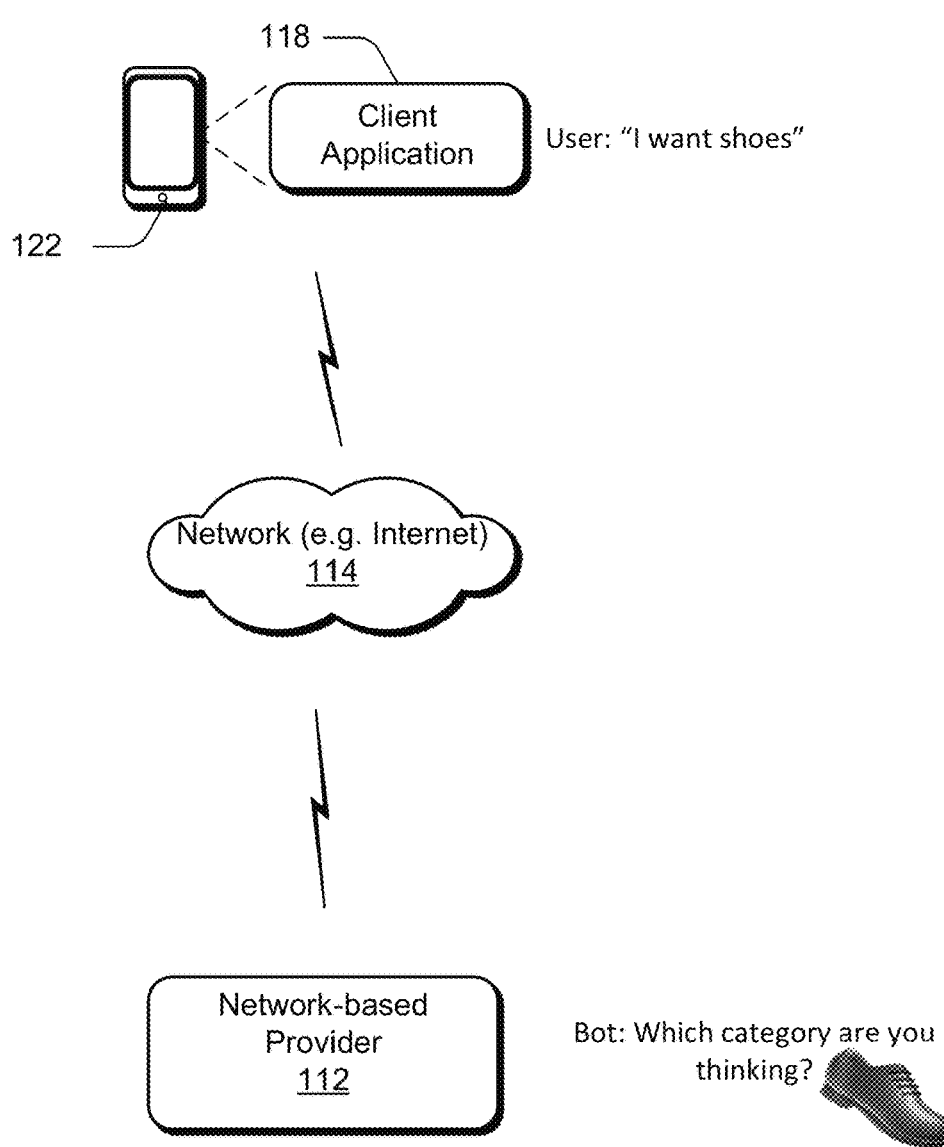
FIG. 6 illustrates an example use scenario in accordance with one or more embodiments.

In various embodiments, input text can be received from, for example, a user in a shopping scenario, and an emoji having a close or closest meaning can be returned or in some way utilized to enhance the user's experience. As an example, consider FIG. 6.

There, client machine 122 (FIG. 1) is shown with client application 118 which enables a user to interact with the network-based provider 112 by way of network 114. In this particular example, the user, through the client application 118, has provided input indicating "I want shoes." The network-based provider 112, by way of a suitably-configured response bot, implemented by one or more of networking and market place applications 130, 132 (FIG. 1) receives the user's input and processes the input to provide a suitable response to the user. In this particular example, the network-based provider computes a vector representation of the user's input text, such as a word-embedding averaged vector representation, and looks for vector representations of emojis that are close or closest to the computed vector representation. This can be performed in any suitable way. In at least some embodiments, the network-based provider can compute a cosine similarity between emojis and the text vector representation provided by the user. The cosine similarities can be ranked based on the highest scores, and a particular emoji can be selected. In the illustrated and described embodiment, the network-based provider provides a response for the user that includes text that asks the user "Which category are you thinking?" along with a shoe emoji. The network-based provider has also responded that the user may add their own category if they so wish.

FIG. 7 depicts a procedure 700 in an example implementation of emoji understanding in accordance with one or more embodiments. The procedure may be implemented utilizing the previously described systems and devices. In the illustrated and described example, aspects of the procedure can be performed by a suitably-configured client machine. Yet other aspects can be performed by a network-based provider. Each of these aspects is labeled accordingly. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

At block 702, text input is generated, as through the use of a suitably-configured client application. The text input can be provided in accordance with any suitable scenario. In at least some embodiments, the text input is provided in accordance with an interactive shopping experience. It is to be appreciated, however, that text input not necessarily associated with an interactive shopping experience can be provided without departing from the spirit and scope of the claimed subject matter. At block 704, the text input is transmitted to a network-based provider. Any suitable type of network-based provider can be utilized including, by way of example and not limitation, a network-based provider that provides online shopping experiences.

At block 706, the network-based provider receives the text input and, at block 708 computes a vector representation of the text input. Any suitable type of vector representation can be computed, examples of which are provided above. At block 710, the network-based provider ascertains one or more emojis that correspond to the vector representation of the text input. This operation can be performed in any suitable way. For example, in at least some embodiments, the network-based provider can compute the cosine similarity between a database of emojis each of which has its own vector representation, and the vector representation of the text input. Based upon the computed cosine similarity and their relative rankings, the network-based provider can ascertain one or more emojis that correspond to the text input. At block 712, the network-based provider formulates a response that includes at least one of the emojis that correspond to the vector representation of the text input. At block 714, the response is transmitted by the network-based provider to the client machine.

At block 716, the client machine receives the transmitted response and, at block 716 displays the received response.

Having considered example text-to-emoji scenarios, consider now example emoji-to-text scenarios in accordance with one or more embodiments.

Emoji-to-Text Scenarios

Figure 8:
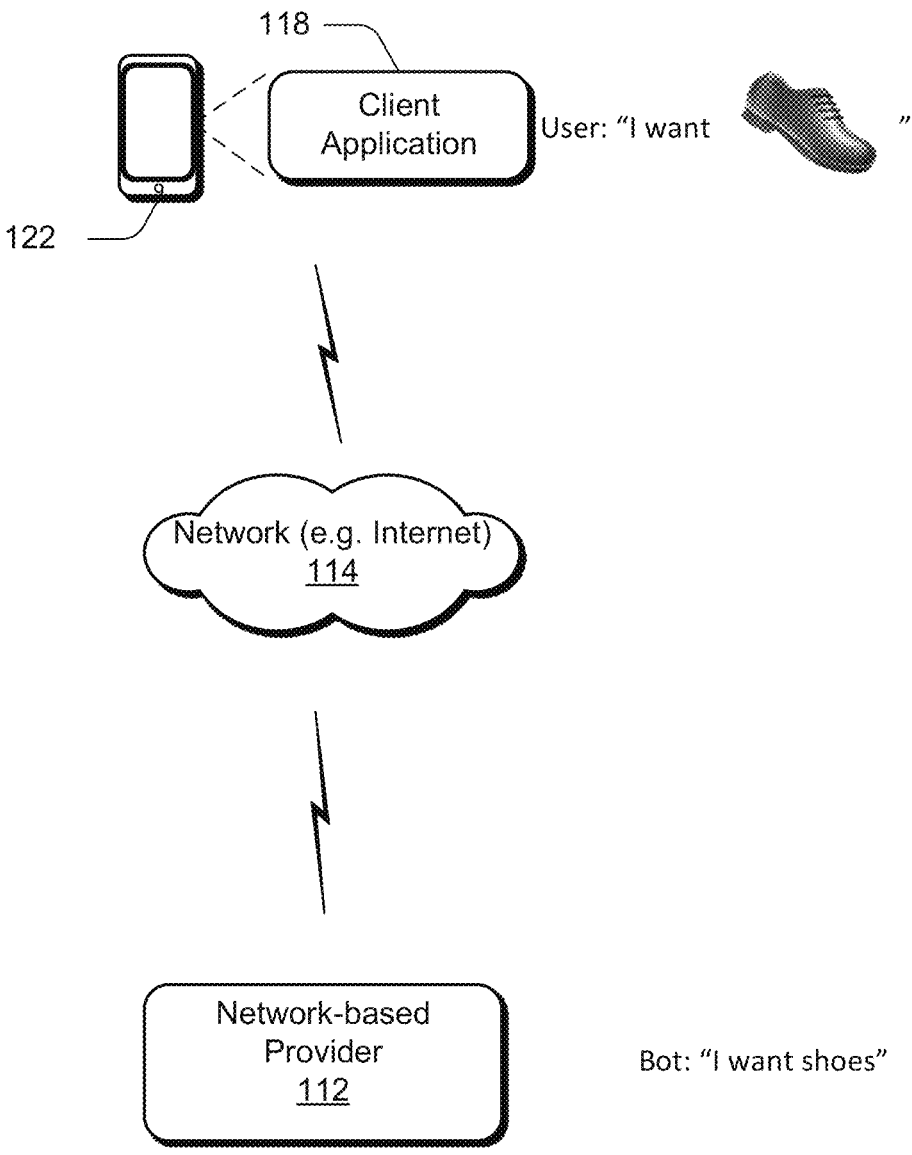
FIG. 8 illustrates an example use scenario in accordance with one or more embodiments.

In one or more embodiments, a number of different emoji-to-text scenarios can take place including, by way of example and not limitation, shopping scenarios, feedback scenarios, learning scenarios, and the like. In various embodiments, an input emoji can be received from, for example, a user in a shopping scenario, and text or other input having a close or closest meaning can be returned or in some way utilized to enhance the user's experience. As an example, consider FIG. 8.

There, client machine 122 (FIG. 1) is shown with client application 118 which enables a user to interact with the network-based provider 112 by way of network 114. In this particular example, the user, through the client application 118, has provided input indicating "I want" and has inserted an emoji in the form of a shoe. The network-based provider 112, by way of a suitably-configured response bot, implemented by one or more of networking and market place applications 130, 132 (FIG. 1) receives the user's input and processes the input to substitute the emoji with text and perform some task using the substituted text or, alternatively, its own understanding of the emoji. In this particular example, the network-based provider computes or otherwise uses a computed vector representation of the emoji, and looks for vector representations of words or phrases that are close or closest to the computed vector representation. This can be performed in any suitable way. In at least some embodiments, the network-based provider can compute a cosine similarity between emojis and text vector representations. The cosine similarities can be ranked based on the highest scores, and particular words or phrases can be selected and employed to perform a task, such as conducting a search, formulating a response, and the like. In the illustrated and described embodiment, the network-based provider may provide a response for the user that includes text that asks the user to specify more information associated with their input.

Figure 9:
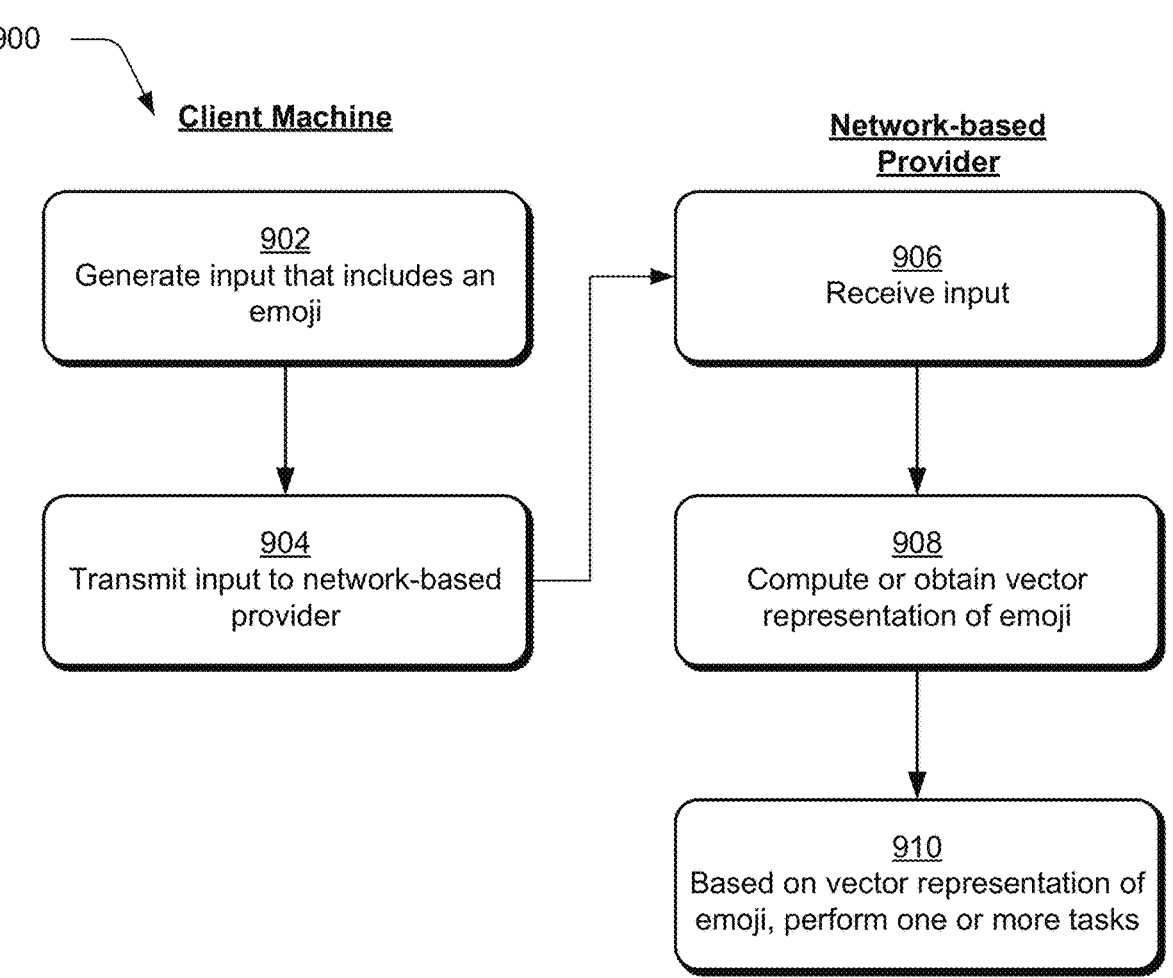
FIG. 9 is a flow diagram that describes operations in accordance with one or more embodiments.

FIG. 9 depicts a procedure 900 in an example implementation of emoji understanding in accordance with one or more embodiments. The procedure may be implemented utilizing the previously described systems and devices. In the illustrated and described example, aspects of the procedure can be performed by a suitably-configured client machine. Yet other aspects can be performed by a network-based provider. Each of these aspects is labeled accordingly. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

At block 902, input is generated that includes one or more emojis, as through the use of a suitably-configured client application. The input can be provided in accordance with any suitable scenario. In at least some embodiments, the input is provided in accordance with an interactive shopping experience. It is to be appreciated, however, that input not necessarily associated with an interactive shopping experience can be provided without departing from the spirit and scope of the claimed subject matter. At block 904, the input is transmitted to a network-based provider. Any suitable type of network-based provider can be utilized including, by way of example and not limitation, a network-based provider that provides online shopping experiences.

At block 906, the network-based provider receives the input and, at block 908 computes or obtains a vector representation of the emoji. For example, a vector may be computed if one is not already accessible from, for example, a suitably-configured database. Alternately or additionally, vector representations of the emoji may already have been pre-computed and available for use by the network-based provider. Any suitable type of vector representation can be computed, examples of which are provided above. At block 910, the network-based provider performs one or more tasks based on the vector representation of the emoji. This can include substituting text that is the same as or semantically similar to text associated with the received input based on computed cosine similarities, and performing one or more tasks associated with text that is the same or semantically similar to the received emoji. For example, in shopping scenarios, if the emoji pertains to a shoe, then the network-based provider may, based on the vector representation of the emoji, utilize other similar text such as "athletic shoe", "dress shoe", "sandal", and the like, to perform one or more services associated with these terms.

Figure 10:
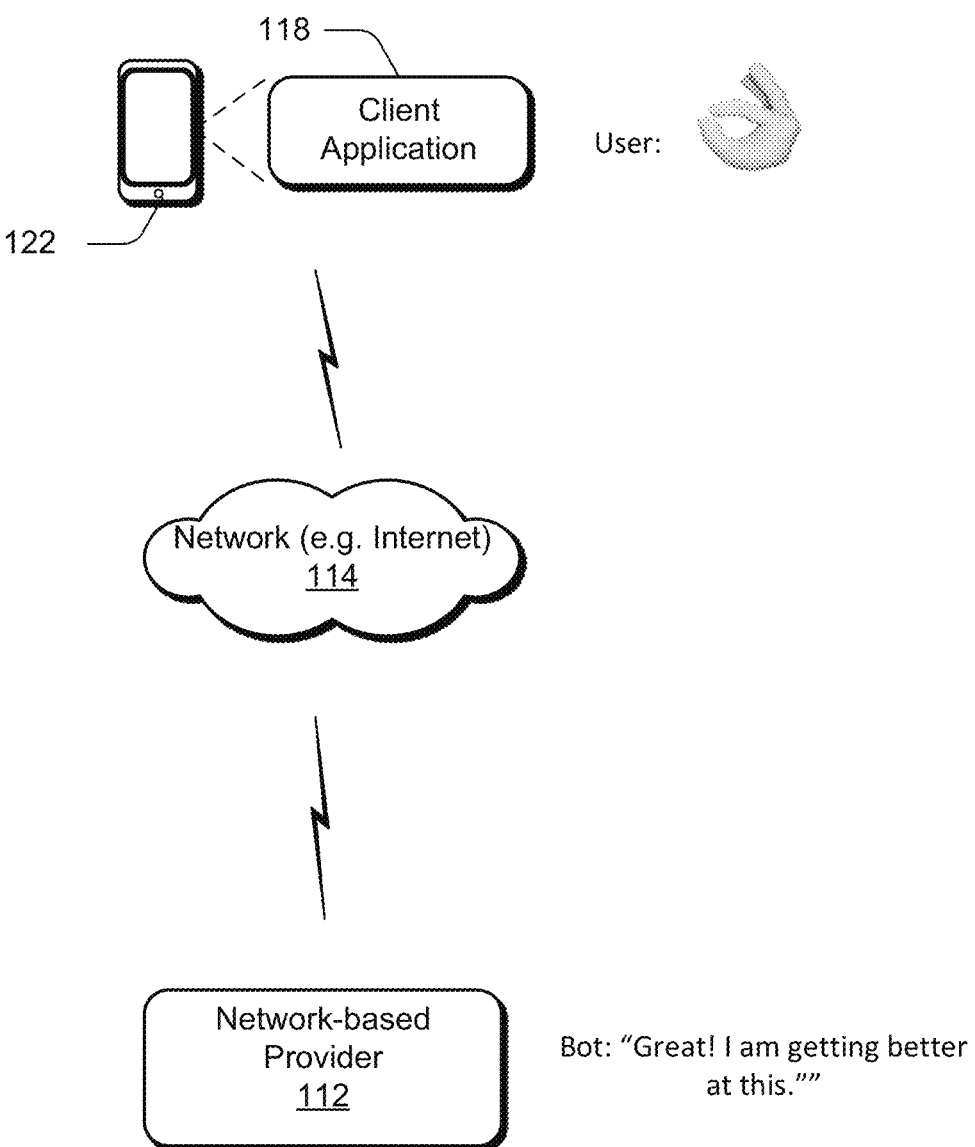
FIG. 10 illustrates an example use scenario in accordance with one or more embodiments.

In other embodiments, emoji-to-text scenarios can include various feedback scenarios. As an example, consider FIG. 10.

There, client machine 122 (FIG. 1) is shown with client application 118 which enables a user to interact with the network-based provider 112 by way of network 114. In this particular example, the user, through the client application 118, has provided input including an "OK" emoji. The network-based provider 112, by way of a suitably-configured response bot, implemented by one or more of networking and market place applications 130, 132 (FIG. 1) receives the user's input and processes the input to ascertain the meaning behind the emoji. In this particular case, the network-based provider may ascertain that the user is satisfied with the service provided by the network-based provider. Accordingly, the network-based provider can map this emoji's meaning to a positive feedback scenario and can provide text input back to the user such as, by way of example, "Great! I am getting better at this." The same or similar can be done for negative feedback such as receiving a"thumbs down" emoji from the user which can prompt a response from the network-based provider of "Thanks for helping us to improve . . . ."

In addition, some feedback from the user may include emoji's that are not necessarily understood. The network-based provider can, responsively, provide textual feedback such as "Sorry, I do not understand these yet." Over time, however, through the vector representations, the network-based provider can come to a clearer, more cogent understanding of particular emojis and their meaning.

In addition, by understanding user-provided emojis, a network-based provider can take a more proactive role in providing the user experience. For example, within the context of an interaction, it may become apparent to the network-based provider that the particular emojis being employed by the user are those associated with various sentiments such as frustration, negativity, dislike, and the like. Based on this, the network-based provider can attempt to perform tasks such as improving the conversation with the user or taking some other remedial action designed to mitigate what might be perceived as an undesirable user experience. Moreover, the use of emojis in communication can be language-independent. That is, many emojis may mean the same thing in different languages. So, for example, if a user in one country visits a shopping site and inserts a "pants" emoji, it may be evident that the user wishes to search for and purchase pants. Likewise, in a different country in which a different languages used, a user in that country may insert the same "pants" emoji. In this case, the network-based provider can ascertain that this user, as well, wishes to shop for pants.

In some instances, however, the same emoji may have different meanings in different countries. In these instances, the corresponding vector representations for the same emoji may very such that from country-to-country, the correct contextual outcome is provided by the network-based provider. In addition, over time, the network-based provider may learn that a particular user employs certain emojis in a manner that is unique or special to that particular user. Accordingly, the network-based provider can adjust the tasks that it performs for this particular user in accordance with an understanding of how that user employs emojis over time.

More generally, emojis can be used in and of themselves to communicate independent of providing any text. In this context, understanding the meaning of emojis through a vector-based representation to understand the meaning and context of emojis can facilitate a system in which emojis may be the sole foundational mode of communicating ideas, content, emotions, messages and the like.

Having considered example emoji-to-text scenarios, consider now an example device that can be utilized to employ the techniques described herein.

Example System and Device

Figure 11:
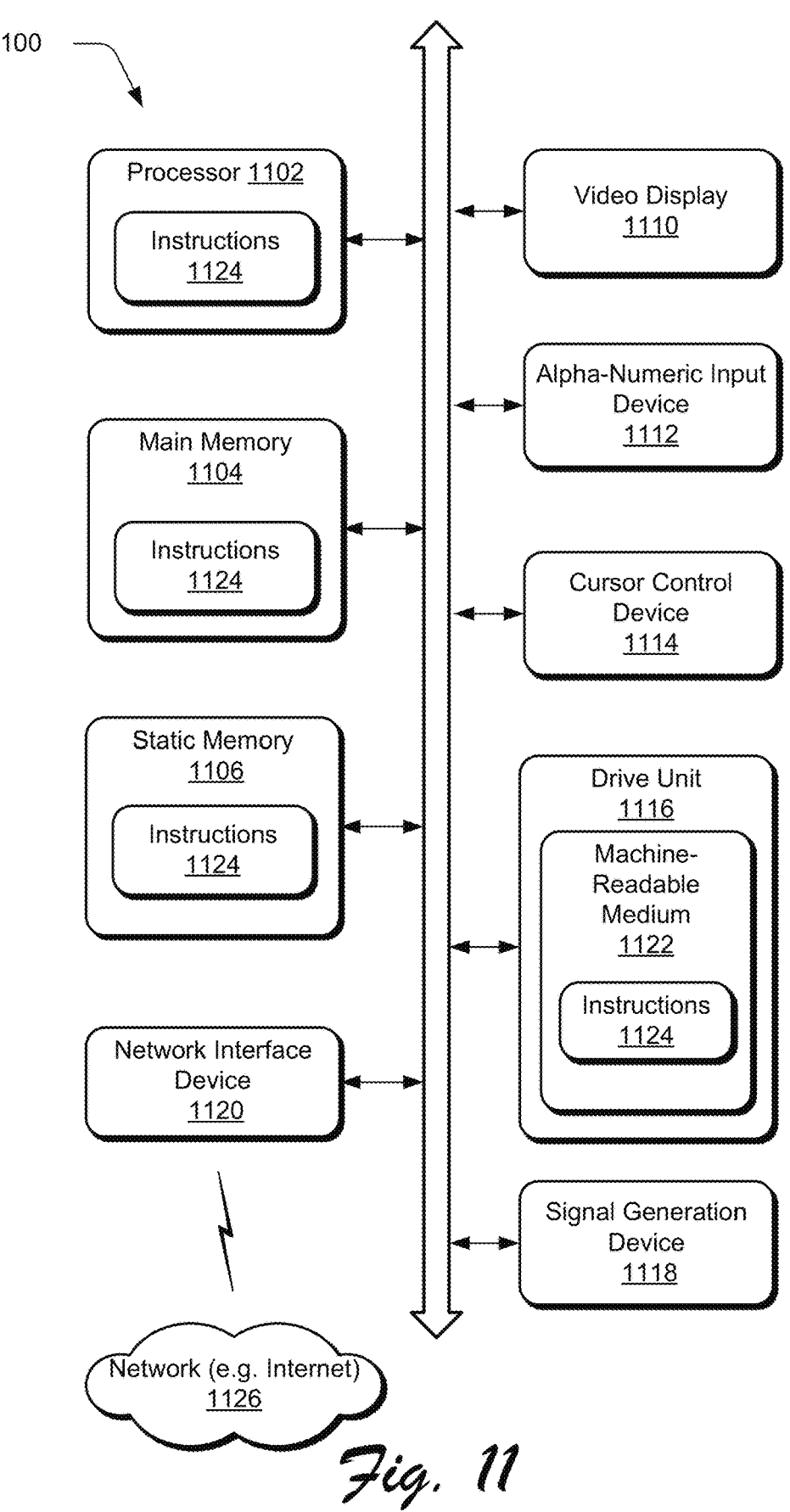
FIG. 11 shows a diagrammatic representation of machine in the example form of a computer system within which a set of instructions when executed may cause the machine to perform any one or more of the methodologies disclosed herein.

FIG. 11 shows a diagrammatic representation of machine in the example form of a computer system 1100 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The instructions 1124 may also reside, completely or at least partially, within the main memory 1104, the static memory 1106, and/or within the data processor 1102 during execution thereof by the computer system 1100. The main memory 1104 and the data processor 1102 also may constitute machine-readable media. The instructions 1124 may further be transmitted or received over a network 1126 via the network interface device 1120. While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a network-based provider and over a network, user input including one or more emojis;

using, by the network-based provider, a computed vector representation representing the one or more emojis, in which the computed vector representation representing the one or more emojis is generated by a trained model configured to update parameters of the trained model based on additional data, to determine computed vector representations representing words or phrases that are close to the computed vector representation representing the one or more emojis;

selecting, by the network-based provider, at least one of the words or phrases of the vector representations representing the words or phrases that are close to the computed vector representation representing the one or more emojis; and based on the at least one of the words or phrases selected of the vector representations representing the words or phrases that are close to the computed vector representation representing the one or more emojis, performing, by the network-based provider, a task for display by a user interface, in which the task is associated with the at least one of the words or phrases selected.

2. The method as described in claim 1, wherein the one or more emojis are received via a message provided by a user using a network application on a client machine.

3. The method as described in claim 2, wherein the message is associated with an experience.

4. The method of claim 2, wherein the network application is a listing application.

5. The method as described in claim 1, wherein the network-based provider provides online experiences.

6. The method as described in claim 1, wherein the task is a formulated response message.

7. The method as described in claim 6, wherein the formulated response message includes at least one additional emoji.

8. A computing device comprising:

a processing system; and a computer-readable storage medium having instructions stored that, responsive to execution by the processing system, causes the processing system to perform operations comprising:

receiving user input including one or more emojis;

using a computed vector representation representing the one or more emojis to determine computed vector representations representing words or phrases that are close to the computed vector representation representing the one or more emojis;

selecting at least one of the words or phrases of the vector representations representing the words or phrases that are close to the computed vector representation representing the one or more emojis; and based on the at least one of the words or phrases selected of the vector representations representing the words or phrases that are close to the computed vector representation representing the one or more emojis, performing a task for display by a user interface, in which the task is associated with the at least one of the words or phrases selected.

9. The computing device as described in claim 8, wherein the one or more emojis are received via a message provided by a user using a network application on a client machine.

10. The computing device as described in claim 9, wherein the message is associated with an interactive shopping experience.

11. The computing device as described in claim 9, wherein the message includes text along with the one or more emojis.

12. The computing device as described in claim 9, wherein the message corresponds to a search.

13. The computing device as described in claim 8, wherein the task is a formulated response message.

14. The computing device as described in claim 13, wherein the formulated response message is communicated via a bot.

15. The computing device as described in claim 8, wherein the computed vector representation representing the one or more emojis is generated by a trained model configured to re-train the trained model based on additional data.

16. A non-transitory computer-readable storage medium encoding computer executable instructions that, when executed by a processing unit, perform operations comprising:

receiving user input including one or more emojis;

using a computed vector representation representing the one or more emojis to determine computed vector representations representing words or phrases that are close to the computed vector representation representing the one or more emojis;

selecting at least one of the words or phrases that are close to the computed vector representation representing the one or more emojis; and based on the at least one of the words or phrases selected of the vector representations representing the words or phrases that are close to the computed vector representation representing the one or more emojis, performing a task for display by a user interface, in which the task is associated with the at least one of the words or phrases selected.

17. The non-transitory computer-readable storage medium as described in claim 16, wherein the one or more emojis are received via a message provided by a user using a network application on a client machine.

18. The non-transitory computer-readable storage medium as described in claim 17, wherein the message includes text along with the one or more emojis.

19. The non-transitory computer-readable storage medium as described in claim 18, wherein the task is a formulated response message.

20. The non-transitory computer-readable storage medium as described in claim 16, wherein the task is a search.

\* \* \* \* \*